United States Patent
Asakura et al.

(10) Patent No.: US 12,015,743 B2
(45) Date of Patent: Jun. 18, 2024

(54) FUNCTION EXECUTING DEVICE AND TERMINAL DEVICE FOR EXECUTING WIRELESS COMMUNICATION ACCORDING TO BLUETOOTH LOW ENERGY

(71) Applicant: BROTHER KOGYO KABUSHIKI KAISHA, Nagoya (JP)

(72) Inventors: Hirotaka Asakura, Nagoya (JP); Takuya Inoue, Nisshin (JP); Munehisa Matsuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/450,045

(22) Filed: Aug. 15, 2023

(65) Prior Publication Data

US 2023/0388426 A1    Nov. 30, 2023

Related U.S. Application Data

(63) Continuation of application No. 17/878,967, filed on Aug. 2, 2022, now Pat. No. 11,765,285, which is a (Continued)

(30) Foreign Application Priority Data

Nov. 13, 2019   (JP) ................................. 2019-205683

(51) Int. Cl.
*H04N 1/00*     (2006.01)
*H04B 17/318*   (2015.01)
(Continued)

(52) U.S. Cl.
CPC ....... *H04N 1/00209* (2013.01); *H04B 17/318* (2015.01); *H04W 4/80* (2018.02);
(Continued)

(58) Field of Classification Search
None
See application file for complete search history.

(56) References Cited

U.S. PATENT DOCUMENTS

| 2017/0286028 A1* | 10/2017 | Yang | G06F 3/1285 |
| 2018/0077738 A1* | 3/2018 | Kim | H04W 76/14 |
| 2019/0215651 A1* | 7/2019 | Ito | H04W 4/023 |

FOREIGN PATENT DOCUMENTS

| JP | 2017-182489 A | 10/2017 |
| JP | 2019-121930 A | 7/2019 |

OTHER PUBLICATIONS

Wi-Fi Alliance, Wi-Fi Peer-to-Peer (P2P) Technical Specification Version 1.1.
(Continued)

*Primary Examiner* — Andrew H Lam
(74) *Attorney, Agent, or Firm* — Scully, Scott, Murphy & Presser, P.C.

(57) ABSTRACT

A function executing device may comprise a first wireless interface according to a Bluetooth Low Energy scheme being capable of repeatedly sending an advertising signal. The function executing device may after a first advertising signal in which a first radio field intensity is used has been sent from the first wireless interface, receive a specific signal via the first wireless interface from a terminal device, change a radio field intensity used for sending the advertising signal from the first radio field intensity to a second radio field intensity lower than the first radio field intensity, and after a second advertising signal in which the second radio field intensity is used has been sent from the first wireless interface, establish a first wireless connection with the terminal device via the first wireless interface.

8 Claims, 7 Drawing Sheets

Related U.S. Application Data continuation of application No. 17/094,379, filed on Nov. 10, 2020, now Pat. No. 11,425,267.

(51) Int. Cl.
*H04W 4/80* (2018.01)
*H04W 12/0431* (2021.01)
*H04W 60/04* (2009.01)
*H04W 76/11* (2018.01)
*H04W 76/34* (2018.01)

(52) U.S. Cl.
CPC ....... *H04W 12/0431* (2021.01); *H04W 60/04* (2013.01); *H04W 76/11* (2018.02); *H04W 76/34* (2018.02); *H04N 2201/006* (2013.01)

(56) References Cited

OTHER PUBLICATIONS

Ex parte Quayle dated Mar. 11, 2022 received in related U.S. Appl. No. 17/094,379.
Notice of Allowance dated Apr. 15, 2022 received in related U.S. Appl. No. 17/094,379.
Ex parte Quayle dated Mar. 2, 2023 received in related U.S. Appl. No. 17/878,967.
Notice of Allowance dated May 15, 2023 received in related U.S. Appl. No. 17/878,967.

* cited by examiner (Conceptual Diagram of Primary Service Group)

FIG. 3

(Data Structure of Primary Service Group)

RWA = Readable without authentication
WWA = Writeable without authentication

First Type Primary Service

| Handle | Attribute Type | Attribute Value | Attribute Permission |
|---|---|---|---|
| 0x0001 | 0x2800 | "0x1800" (GAP Service) | RWA |
| 0x0002 | 0x2803 | Read, Handle: n1, UUID: 0x2A00, | RWA |
| ... | ... | ... | ... |
| n1 | 0x2A00 (Device Name) | Device Name "CCC" | RWA |
| ... | ... | ... | ... |

Second Type Primary Service

| Handle | Attribute Type | Attribute Value | Attribute Permission |
|---|---|---|---|
| n10 | 0x2800 | "aaa0" (WFD Connection) | RWA |
| n11 | 0x2803 | Write, Handle: n16, UUID: aaa1 | RWA |
| n12 | 0x2803 | Write, Handle: n17, UUID: aaa2 | RWA |
| n13 | 0x2803 | Write, Handle: n18, UUID: aaa3 | RWA |
| n14 | 0x2803 | Read, Handle: n19, UUID: aaa4 | RWA |
| n15 | 0x2803 | Write, Handle: n20, UUID: aaa5 | RWA |
| n16 | aaa1 (Power Control) | Low Power Instruction | WWA |
| n17 | aaa2 (Handover Mode MAC Address) | MAC Address for HO | WWA |
| n18 | aaa3 (Public Encryption Key) | Encryption Key 200 | WWA |
| n19 | aaa4 (Connection Information) | SSID "XXX", Password "YYY", MAC Address "WF5678-AAA", IP Address "192.168.1.1" | RWA |
| n20 | aaa5 (Change Status) | WFD Start Instruction | WWA |
| n30 | 0x2800 | "bbb0" (BT Control) | RWA |
| n31 | 0x2803 | Write, Handle: n32, UUID: bbb1 | RWA |
| n32 | bbb1 (Pairing Control) | Disconnection Instruction | WWA |

FUNCTION EXECUTING DEVICE AND TERMINAL DEVICE FOR EXECUTING WIRELESS COMMUNICATION ACCORDING TO BLUETOOTH LOW ENERGY

CROSS-REFERENCE TO RELATED APPLICATION

This application is a continuation application of U.S. Ser. No. 17/878,967 filed on Aug. 2, 2022 which is a continuation application of U.S. Ser. No. 17/094,379 filed on Nov. 10, 2020, now U.S. Pat. No. 11,425,267 issued on Aug. 23, 2022 and claims priority to Japanese Patent Application No. 2019-205683 filed on Nov. 13, 2019, the contents of which are hereby incorporated by reference into the present application.

TECHNICAL HELD

The disclosure herein discloses art to execute a wireless communication according to a Bluetooth (registered trademark) Low Energy (BLE) scheme between a function executing device and a terminal device.

DESCRIPTION OF RELATED ART

A communication device configured to execute pairing according to the BLE scheme with an information processing device is known.

SUMMARY

The disclosure herein discloses art to control communication of target information between a function executing device and a terminal device in accordance with a distance between the function executing device and the terminal device.

A function executing device disclosed herein may comprise: a first wireless interface configured to execute wireless communication according to a Bluetooth (Registered Trademark) Low Energy (BLE) scheme, the first wireless interface being capable of repeatedly sending an advertising signal; a processor; and a memory storing computer-readable instructions, wherein the computer-readable instructions, when executed by the processor, cause the function executing device to: after a first advertising signal in which a first radio field intensity is used has been sent from the first wireless interface, receive a specific signal via the first wireless interface from a terminal device which received the first advertising signal; in a case where the specific signal is received from the terminal device, change a radio field intensity used for sending the advertising signal from the first radio field intensity to a second radio field intensity that is lower than the first radio field intensity; after a second advertising signal in which the second radio field intensity is used has been sent from the first wireless interface, receive a first connection request via the first wireless interface from the terminal device which received the second advertising signal; in a case where the first connection request is received from the terminal device, establish a first wireless connection with the terminal device via the first wireless interface; and in a case where the first wireless connection with the terminal device is established, communicate target information with the terminal device via the first wireless interface by using the first wireless connection, the target information being information for using a specific function of the function executing device.

Another function executing device disclosed herein may comprise: a first wireless interface configured to execute wireless communication according to a Bluetooth (Registered Trademark) Low Energy (BLE) scheme, the first wireless interface being capable of repeatedly sending an advertising signal; a processor; and a memory storing computer-readable instructions, wherein the computer-readable instructions, when executed by the processor, cause the function executing device to: after a first advertising signal in which a first radio field intensity is used has been sent from the first wireless interface, receive a second connection request via the first wireless interface from a terminal device which received the first advertising signal; in a case where the second connection request is received from the terminal device, establish a second wireless connection with the terminal device via the first wireless interface; in a case where the second wireless connection is established with the terminal device, change a radio field intensity used for sending the advertising signal from the first radio field intensity to a second radio field intensity that is lower than the first radio field intensity; after a second advertising signal in which the second radio field intensity is used has been sent from the first wireless interface, receive a first connection request via the first wireless interface from the terminal device which received the second advertising signal; in a case where the first connection request is received from the terminal device, establish a first wireless connection with the terminal device via the first wireless interface; and in a case where the first wireless connection with the terminal device is established, communicate target information with the terminal device via the first wireless interface by using the first wireless connection, the target information being information for using a specific function of the function executing device.

The disclosure herein discloses a non-transitory computer-readable recording medium storing computer-readable instructions for a terminal device. The computer-readable instructions, when executed by a processor of the terminal device, may cause the terminal device to: receive a first advertising signal in which a first radio field intensity is used from a function executing device via a wireless interface of the terminal device, the wireless interface being configured to execute wireless communication according to a Bluetooth (Registered Trademark) Low Energy (BLE) scheme; after the first advertising signal has been received from the function executing device, send a specific signal to the function executing device via the wireless interface; after the specific signal has been sent to the function executing device, receive a second advertising signal in which a second radio field intensity that is lower than the first radio field intensity is used from the function executing device via the wireless interface; after the second advertising signal has been received from the function executing device, send a connection request to the function executing device via the wireless interface, wherein a wireless connection is established with the function executing device via the wireless interface in response to the connection request being sent to the function executing device; and in a case where the wireless connection with the function executing device is established, communicate target information for using a specific function of the function executing device with the function executing device via the wireless interface by using the wireless connection.

The disclosure herein discloses another non-transitory computer-readable recording medium storing computer-readable instructions for a terminal device. The computer-readable instructions, when executed by a processor of the terminal device, may cause the terminal device to: receive a first advertising signal in which a first radio field intensity is used from a function executing device via a wireless interface of the terminal device, the wireless interface being configured to execute wireless communication according to a Bluetooth (Registered Trademark) Low Energy (BLE) scheme; after the first advertising signal has been received from the function executing device, send a second connection request to the function executing device via the wireless interface, wherein a second wireless connection is established with the function executing device via the wireless interface in response to the second connection request being sent to the function executing device; after the second wireless connection has been established with the function executing device, receive a second advertising signal in which a second radio field intensity that is lower than the first radio field intensity is used from the function executing device via the wireless interface; after the second advertising signal has been received from the function executing device, send a first connection request to the function executing device via the wireless interface, wherein a first wireless connection is established with the function executing device via the wireless interface in response to the first connection request being sent to the function executing device; and in a case where the first wireless connection with the function executing device is established, communicate target information for using a specific function of the function executing device with the function executing device via the wireless interface by using the first wireless connection.

Methods implemented by the above function executing devices, computer programs for realizing the above function executing devices, and non-transitory computer-readable recording mediums storing these computer programs are also novel and useful. Methods implemented by the above terminal devices, and the above terminal devices themselves are also novel and useful. Systems comprising the above function executing devices and the above terminal devices are also novel and useful.

BRIEF DESCRIPTION OF DRAWINGS

FIG. 3 shows a data structure of the Primary Service Group of the printer.

EMBODIMENTS (Configuration of Communication System 2: FIG. 1)

As shown in FIG. 1, a communication system 2 includes a portable terminal 10 (hereinbelow simply termed "terminal 10") and a printer 100. In the present embodiment, firstly a wireless connection according to a Bluetooth Low Energy (BLE) scheme (hereinbelow termed "BT connection") is established between the terminal 10 and the printer 100, and information for establishing a wireless connection according to a Wi-Fi scheme (hereinbelow termed "Wi-Fi connection") is sent from the printer 100 to the terminal 10. After this, the Wi-Fi connection is established between the terminal 10 and the printer 100. As above, in this embodiment, the shift of communication between the terminal 10 and the printer 100 from communication according to the BT connection to communication according to the Wi-Fi connection is realized. That is, in the present embodiment, a so-called handover (hereinbelow may be termed "HO") from the BT connection to the Wi-Fi connection is realized.

(Configuration of Terminal 10)

Figure 1:
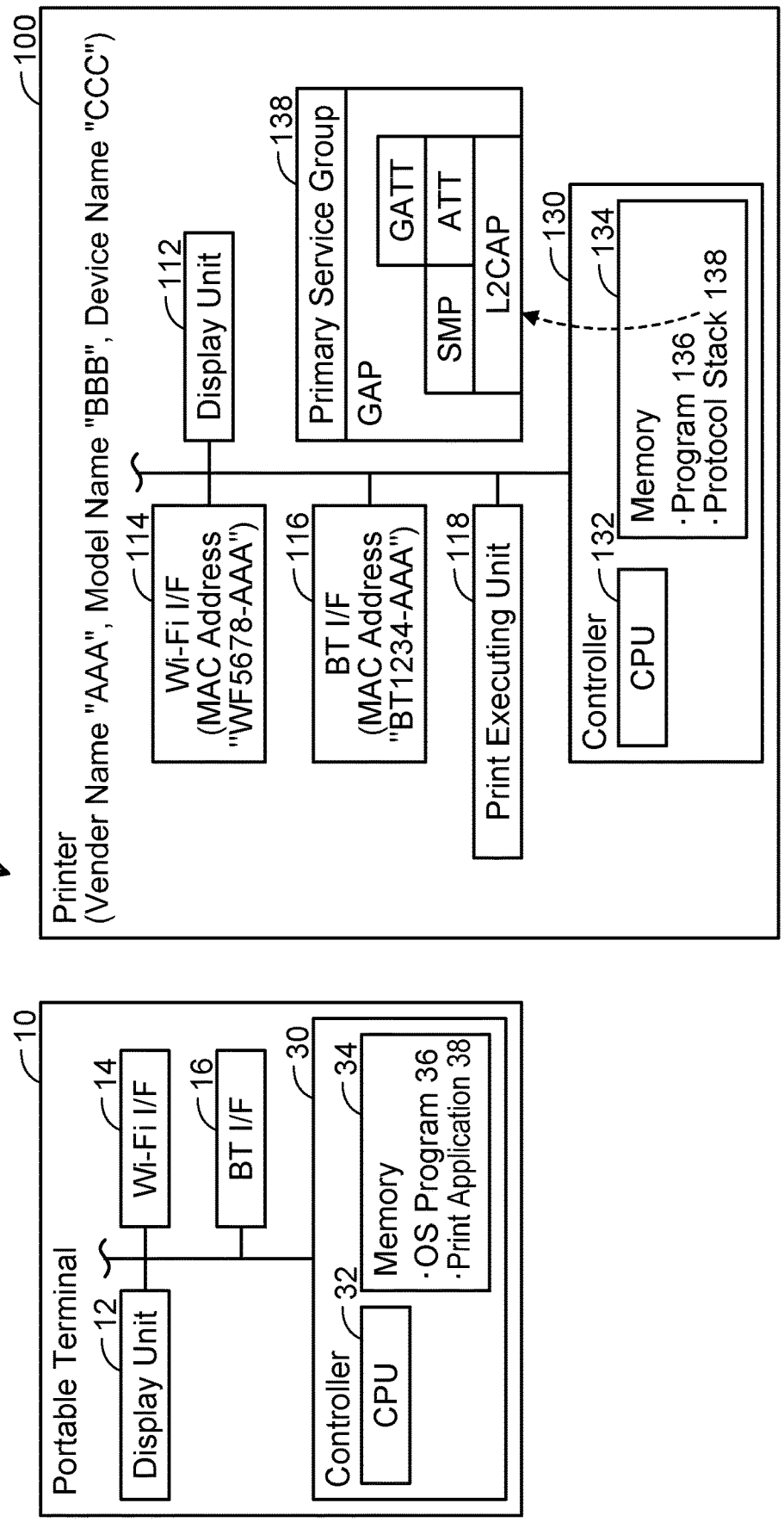
FIG. 1 shows a configuration of a communication system.

The terminal 10 is a portable terminal device such as a cell phone (e.g., a smartphone), a PDA, or a tablet PC. The terminal 10 includes a display unit 12, a Wi-Fi interface 14, a Bluetooth (registered trademark, BT) interface 16, and a controller 30. The respective units 12 to 30 are connected by a bus line (reference sign not given). Hereinbelow, an interface will simply be termed "I/F".

The display unit 12 is a display configured to display various types of information. The display unit 12 also functions as a touch panel (i.e., an operation unit) for accepting instructions from a user.

The Wi-Fi I/F 14 is a wireless interface configured to execute wireless communication according to the Wi-Fi scheme. The Wi-Fi scheme may, for example, be a wireless communication scheme for executing wireless communication according to 802.11 standard by the Institute of Electrical and Electronics Engineers, Inc. (IEEE), or standards complying therewith (e.g., 802.11a, 11b, 11g, 11n, 11ac). The Wi-Fi I/F 14 especially supports a Wi-Fi Direct (registered trademark, WFD) scheme developed by the Wi-Fi Alliance. The WFD scheme is a wireless communication scheme described in the standard "Wi-Fi Peer-to-Peer (P2P) Technical Specification Version1.1" created by the Wi-Fi Alliance. The terminal 10 is configured to operate in one of a Group Owner (G/O) state, a Client (CL) state, and a device state of the WFD scheme. For example, the terminal 10 may operate as a CL of the WFD scheme and participate in a wireless network formed by an external device (such as the printer 100) operating as a G/O of the WFD scheme.

The BT I/F 16 is an I/F configured to execute wireless communication according to the BT scheme. The BT scheme is a wireless communication scheme based on IEEE 802.15.1 standard and standards complying therewith. More specifically, the BT I/F 16 supports the BLE scheme. The BLE scheme is a standard realized by the BT scheme version 4.0 or later version.

Differences between the Wi-Fi scheme and the BT scheme will be described. A communication speed of the Wi-Fi scheme (e.g., a maximum communication speed of 600M bps) is faster than a communication speed of the BT scheme (e.g., a maximum communication speed of 24 Mbps). A frequency of carrier waves used in communication of the Wi-Fi scheme is in 2.4 GHz band or 5.0 GHz band. A frequency of carrier waves used in communication of the BT scheme is in 2.4 GHz band. Further, a maximum distance with which communication according to the Wi-Fi scheme can be executed (e.g., about 100 m) is greater than a maximum distance with which communication according to the BT scheme can be executed (e.g., about several ten meters).

The controller 30 includes a CPU 32 and a memory 34. The CPU 32 is configured to execute various processes in accordance with programs 36 and 38 stored in the memory 34. The memory 34 is constituted of a volatile memory, a non-volatile memory, and the like, and stores an Operating System (OS) program 36 (hereinbelow simply termed "OS 36") and a print application 38 (hereinbelow simply termed "application 38").

The OS 36 is a program for controlling basic operations of the terminal 10, and may, for example, be iOS (registered trademark) or android (registered trademark). The application 38 is an application for executing HO with the printer 100 and thereafter sending image data representing an image to be printed to the printer 100 using a Wi-Fi connection. The application 38 may, for example, be installed in the terminal 10 from a server on the Internet provided by a vendor of the printer 100, or may be installed in the terminal 10 from a medium shipped with the printer 100.

(Configuration of Printer 100)

The printer 100 is a peripheral device (e.g., a peripheral device of the terminal 10) configured to execute a print function. A vendor name, a model name, and a device name of the printer 100 are respectively "AAA", "BBB", and "CCC". The printer 100 includes a display unit 112, a Wi-Fi I/F 114, a BT I/F 116, a print executing unit 118, and a controller 130.

The display unit 112 is a display configured to display various types of information. The display unit 112 also functions as a touch panel (i.e., an operation unit) for accepting instructions from the user. The Wi-Fi I/F 114 is similar to the Wi-Fi I/F 14 of the terminal 10. That is, the Wi-Fi I/F 114 supports the WFD scheme. A MAC address "WF5678-AAA" is assigned to the Wi-Fi I/F 114. This MAC address includes the vendor name "AAA" of the printer 100. The BT I/F 116 is similar to the BT I/F 16 of the terminal 10. That is, the BT I/F 116 supports the BLE scheme. A MAC address "BT1234-AAA" is assigned to the BT I/F 116. This MAC address includes the vendor name "AAA" of the printer 100. The print executing unit 118 includes a printing mechanism of inkjet scheme or laser scheme, for example.

The controller 130 includes a CPU 132 and a memory 134. The CPU 132 is configured to execute various processes in accordance with a program 136 stored in the memory 134. The memory 134 is constituted of a volatile memory, a non-volatile memory, and the like, and stores a protocol stack 138 in addition to the program 136.

The protocol stack 138 includes a protocol stack according to the BLE scheme, and has a hierarchical structure shown in FIG. 1. A Logical Link Control and Application Protocol (L2CAP) is a stack for establishing a BT connection (hereinbelow may be termed "L2CAP Link"). A Security Manager Protocol (SMP) and an Attribute Protocol (ATT) are upper layers of the L2CAP. The SMP is a protocol for encrypting information that is communicated using the BT connection. The ATT is a protocol for defining an access scheme for communication using the BT connection between a server and a client. A Generic Attribute Profile (GATT) is an upper layer of the ATT, and is a protocol for defining functions of the server and the client. A Generic Access Profile (GAP) is an upper layer of the L2CAP, SMP, ATT, and GATT, and is a protocol for defining a function that is common among devices capable of communicating according to the BLE scheme. A Primary Service Group is an upper layer of the GAP, and is an application for defining basic operations related to communication according to the BLE scheme. Hereinbelow, Primary Service will simply be termed "PS".

Figure 2:
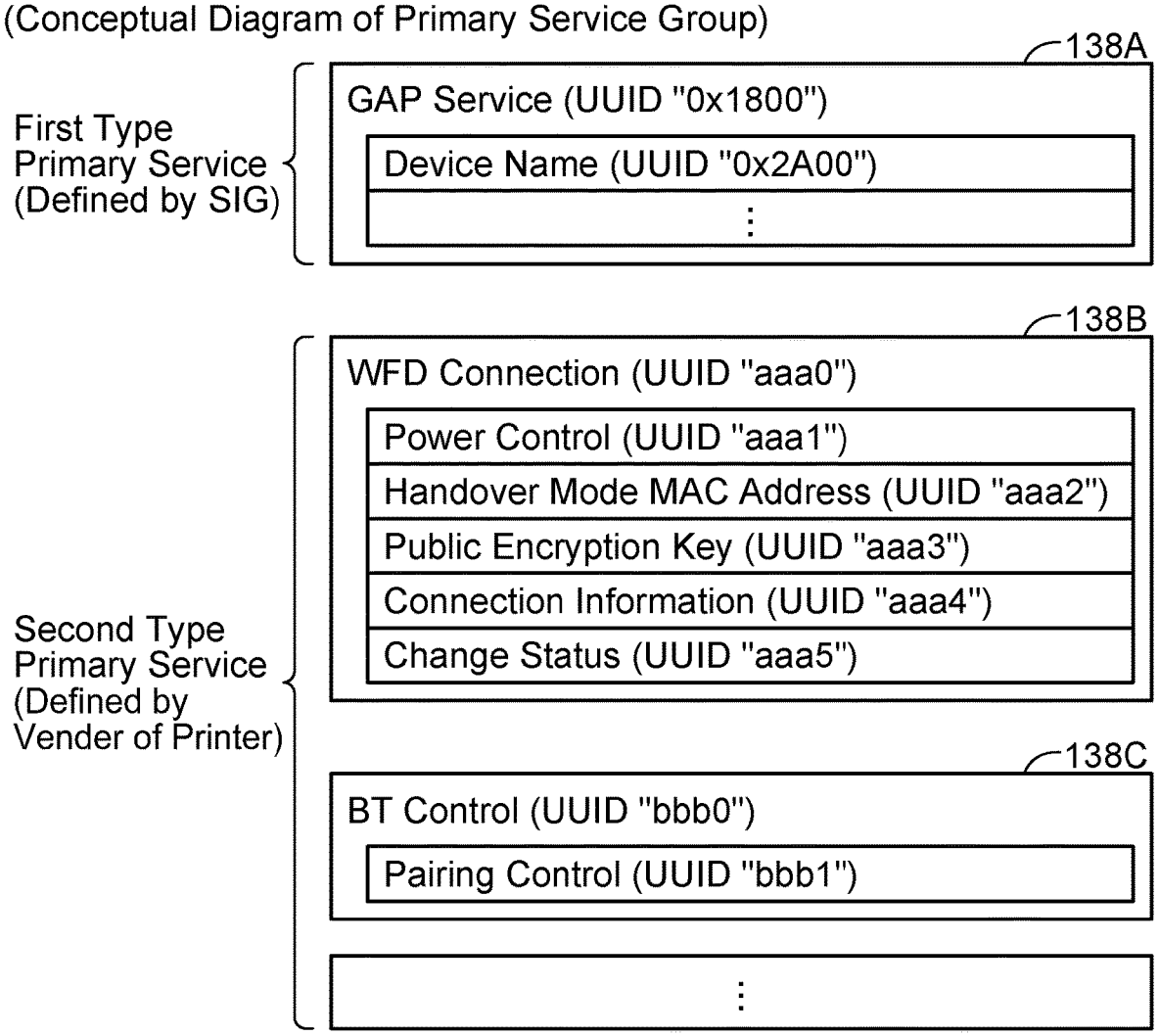
FIG. 2 shows a conceptual diagram of a Primary Service Group of a printer.

(Concept of PS Group: FIG. 2)

A concept of the PS group included in the protocol stack 138 will be described with reference to FIG. 2. The table of FIG. 2 conceptually illustrates the PS group to facilitate understanding, thus the illustration is different from a specific data structure of the PS group. The data structure of the PS group will be described with reference to FIG. 3 after explanation on FIG. 2. The PS group is divided into a first-type PS defined by a Bluetooth SIG (i.e., predetermined by the BT scheme standard) and a second-type PS defined by the vendor of the printer 100.

(First-Type PS)

The first-type PS includes a GAP Service 138A (hereinbelow simply termed "GA 138A"). The GA 138A is a PS for sending information related to the BT I/F 116. This information includes the device name "CCC", for example. A preset UUID "0x1800" is assigned to the GA 138A. The GA 138A includes a plurality of Characteristics (hereinbelow simply termed "CHs"). Each CH is information defining a specific function of the PS. The plurality of CHs included in the GA 138A includes a CH "Device Name" which defines transmission of the device name "CCC". A predetermined UUID "0x2A00" is assigned to the CH "Device Name". In FIG. 2, illustration of other CHs included in the GA 138A is omitted.

(Second-Type PS)

The second-type PS includes a WFD Connection 138B (hereinbelow simply termed "WC 138B") and a BT Control 138C (hereinbelow simply termed "BC 138C").

The WC 138B is a PS for defining communication of respective information for establishing a Wi-Fi connection according to the WFD scheme, and a UUID "aaa0" determined by the vendor of the printer 100 is assigned thereto. A plurality of CHs included in the WC 138B includes "Power Control", "Handover Mode MAC Address", "Public Encryption Key", "Connection Information", and "Change Status".

The "Power Control" is a CH (with a UUID "aaa1") for defining reception of a Low Power instruction for lowering a radio field intensity used by the BT I/F 116 (i.e., writing of information in the printer 100). The "Handover Mode MAC Address" is a CH (with a UUID "aaa2") for defining reception of a MAC address for HO. The "Public Encryption Key" is a CH (with a UUID "aaa3") for defining reception of an encryption key. The "Connection Information" is a CH (with a UUID "aaa4") for defining transmission of information for establishing a Wi-Fi connection (i.e., reading of information from the printer 100). The "Change Status" is a CH (with a UUID "aaa5") for defining reception of a WFD start instruction for causing the printer 100 to operate as the G/O.

The BC 138C is a PS for receiving an instruction for changing a state of the BT I/F 116, and a UUID "bbb0" determined by the vendor of the printer 100 is assigned thereto. A CH included in the BC 138C includes "Pairing Control". The "Pairing Control" is a CH (with a UUID "bbb1") for defining reception of a disconnection instruction for disconnecting a BT connection (i.e., L2CAP Link).

(Data Structure of PS Group: FIG. 3)

Next, the specific data structure of the PS group will be described with reference to FIG. 3. The PS group has a table structure in which Handles, Attribute Types, Attribute Values, and Attribute Permissions are associated with each other. The Handles are serial numbers continued from "0x0001". In FIG. 3, a part of the data structure following "0x0002" is omitted. Due to this, the Handles following "0x0002" are not actual values but are expressed by signs "nk (k is an integer of 1 or more)". Each Attribute Type (hereinbelow simply termed "AType") is an identifier (i.e., a UUID) indicating a type of information to be communicated. Each Attribute Value (hereinbelow simply termed "AValue") indicates information to be communicated. Each Attribute Permission (hereinbelow simply termed "APer") is an item related to the SMP, more specifically, it indicates a condition for permitting reading of information from the printer 100 or writing of information in the printer 100.

In the present embodiment, "Readable without authentication (hereinbelow termed "RWA")" or "Writeable without authentication (hereinbelow termed "WWA")" is described as the A-Per. The RWA indicates that Authentication is not requested upon reading of information from the printer 100. The WWA indicates that Authentication is not requested upon writing of information in the printer 100. Although phrases of "without encryption" and "without authorization" are omitted, the RWA and WWA indicate that neither Encryption nor Authorization is requested upon reading or writing of information.

(First-Type PS)

The GA 138A includes a data group corresponding to a Handle range of "0x0001" to a predetermined value (which is a value immediately preceding "n10"). Data corresponding to the Handle "0x0001" is as follows. The AType includes a UUID "0x2800" indicating that the data is head data in the PS. The AValue includes a UUID "0x1800". The APer includes the RWA.

Data corresponding to a Handle "0x0002" is as follows. The AType includes a UUID "0x2803" indicating CH Declaration. The AValue includes a property indicating "Read", a Handle "n1", and a UUID "0x2A00". The APer includes the RWA.

Data corresponding to a Handle "n1" is as follows. The AType includes the UUID "0x2A00" corresponding to the CH "Device Name". The AValue includes the device name "CCC". The APer includes the RWA.

Since the GA 138A has the aforementioned data structure, the device name "CCC" in the GA 138A is read as follows. When the printer 100 (i.e., a BT scheme server) receives a Read By Type Request signal in which the UUID "0x2803" is designated from a BT scheme client (e.g., the portable terminal 10), it permits reading of the AValue (i.e., the property "Read", Handle "n1", and UUID "0x2A00"), which corresponds to the UUID "0x2803", according to the RWA indicated by the APer corresponding to the UUID "0x2803". As a result, the client can receive the above information and acknowledge based on the information that reading of the information corresponding to the Handle "n1" and the UUID "0x2A00" can be executed. Then, the client sends a Read By Type Request signal in which the UUID "0x2A00" is designated to the printer 100 to receive (i.e., read) the device name "CCC" from the printer 100.

(Second-Type PS)

The WC 138B is a data group corresponding to a Handle range of "n10" to "n20". Data corresponding to the Handle "n10" is as follows. The AType includes the UUID "0x2800". The AValue includes the UUID "aaa0". The APer includes the RWA.

Data corresponding to Handles "n11" to "n15" is as follows. Each of the ATypes includes the UUID "0x2803". Each of the AValues includes a property "Write" or "Read", a Handle (e.g., "n16"), and a UUID (e.g., "aaa1"). Each of the APers includes the RWA.

Data corresponding to a Handle "n16" is as follows. The AType includes the UUID "aaa1" of the CH "Power Control". The Low Power instruction is to be written as the AValue by the client. It should be noted that prior to this information being actually written, the AValue includes empty information (e.g., no information). Due to this, in FIG. 3, the information to be written is indicated by a broken line. The APer includes the WWA.

Since the Handle "n16" of the WC 138B has the aforementioned data structure, the Low Power instruction is written as the AValue corresponding to the Handle "n16" as follows. When receiving a Read By Type Request signal in which the UUID "0x2803" is designated from a client (e.g., the portable terminal 10), the printer 100 (i.e., the BT scheme server) permits the client to read each one of the AValues (i.e., the property "Read" and "Write", Handles "n16" to "n20", and UUIDs "aaa1" to "aaa5") corresponding to the UUID "0x2803" according to the RWA indicated by the APers corresponding to the UUID "0x2803". As a result, the client can read the above information and acknowledge based on the information that writing of the information corresponding to the Handle "n16" and the UUID "aaa1" can be executed. Then, the client sends to the printer 100 a Write Request signal that has the Handle "n16" designated therein and includes the Low Power instruction to write the Low Power instruction in the printer 100.

Data corresponding to each of Handles "n17" to "n20" is as shown in the drawing. A MAC address for HO, an encryption key 200, and a WFD start instruction are to be written as the AValues corresponding to the Handles "n17", "n18", and "n20", respectively. The AValue corresponding to the Handle "n19" includes information for establishing a Wi-Fi connection with the printer 100. This information includes an SSID "XXX" of a wireless network in which the printer 100 operates as the G/O, a password "YYY" of this wireless network, the MAC address "WF5678-AAA" of the Wi-Fi I/F 114 of the printer 100, and an IP address "192.168.1.1" of the printer 100.

The BC 138C is a data group corresponding to a Handle range of "n30" to "n32". Data corresponding to each of Handles "n30" to "n32" is as shown in the drawing. A disconnection instruction is to be written as the AValue corresponding to the Handle "n32".

Figure 4:
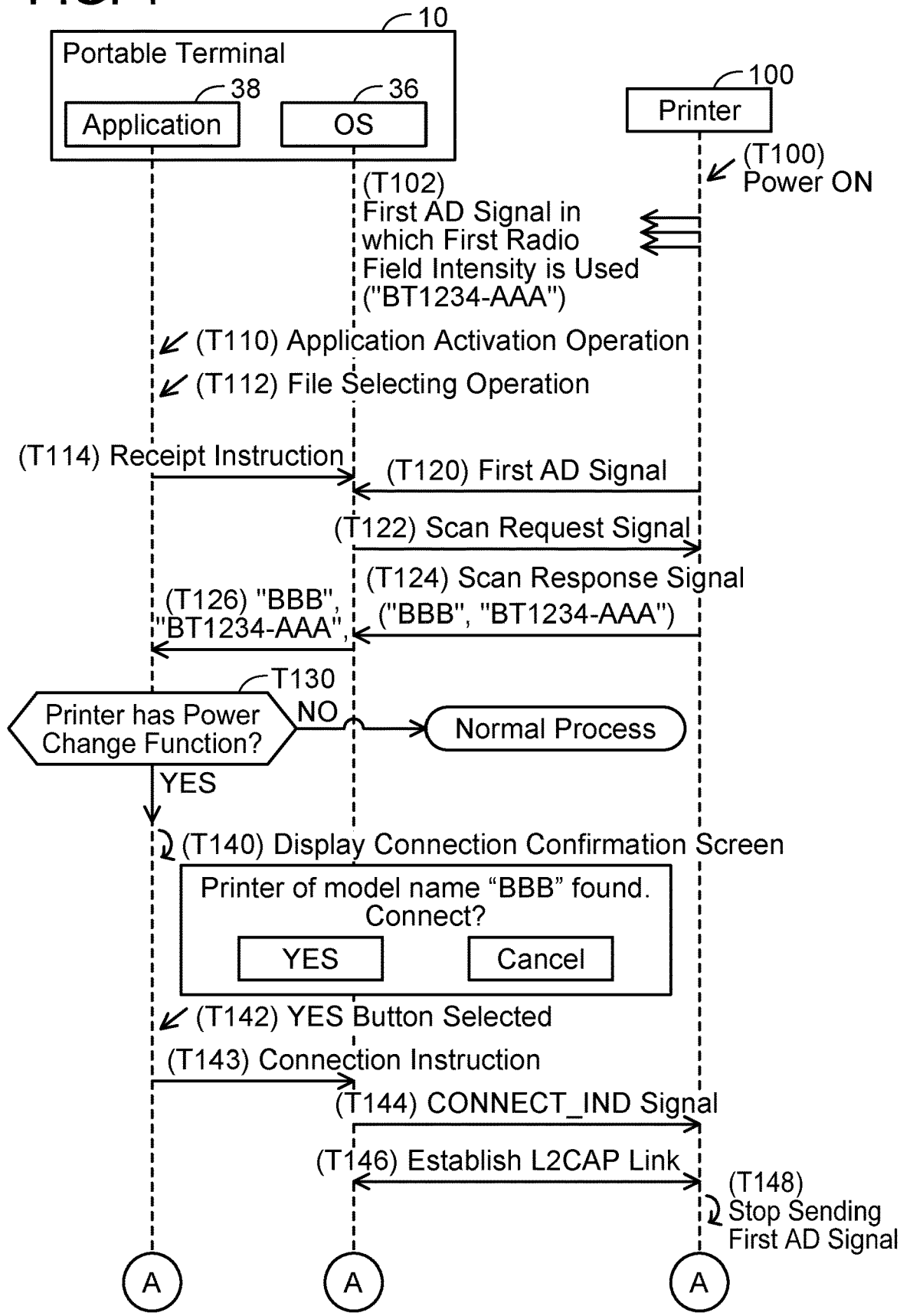
FIG. 4 shows a sequence diagram of a process executed by a portable terminal and the printer.

(Specific Process: FIG. 4)

Figure 5:
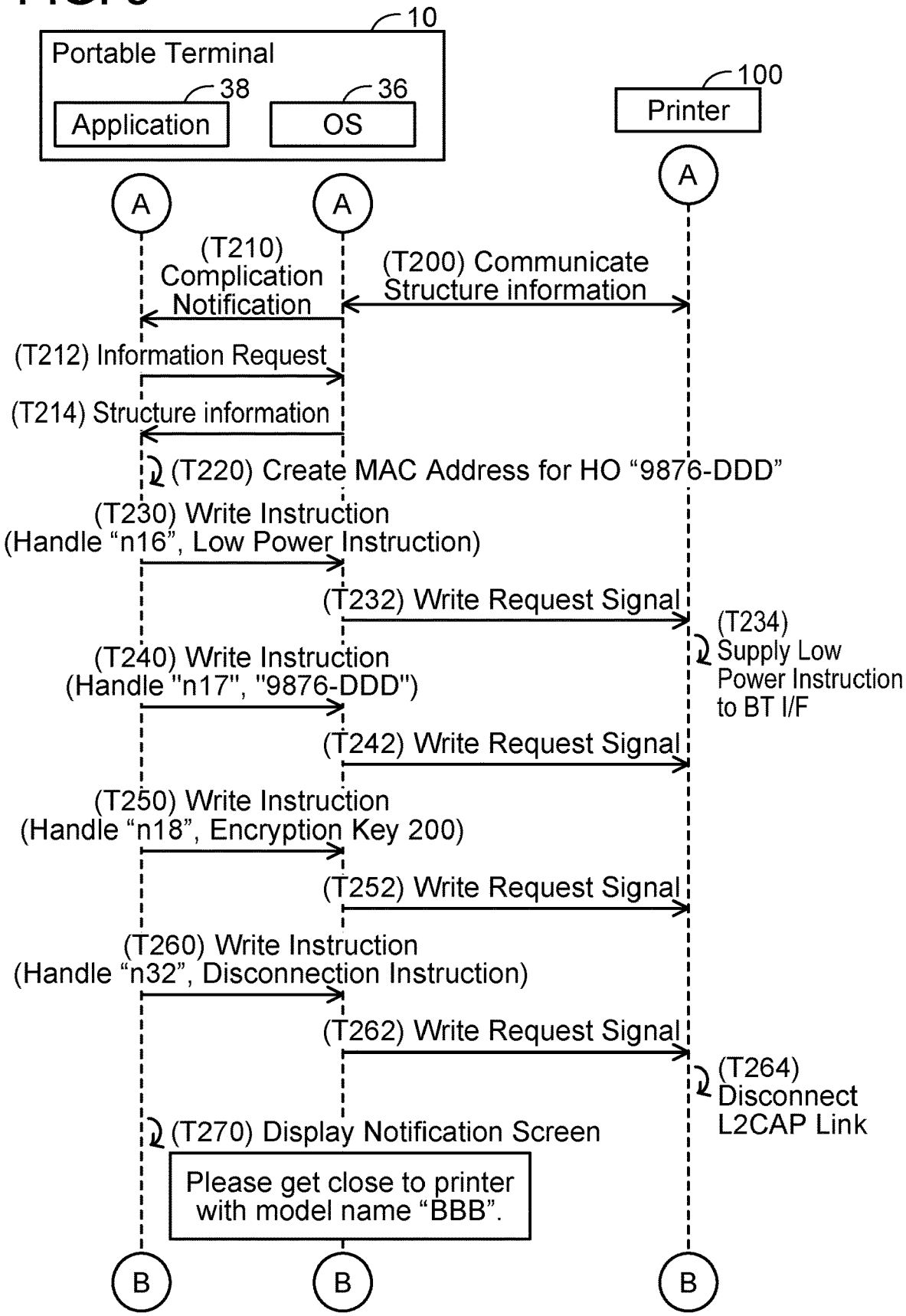
FIG. 5 shows a continuation of FIG. 4.
Figure 6:
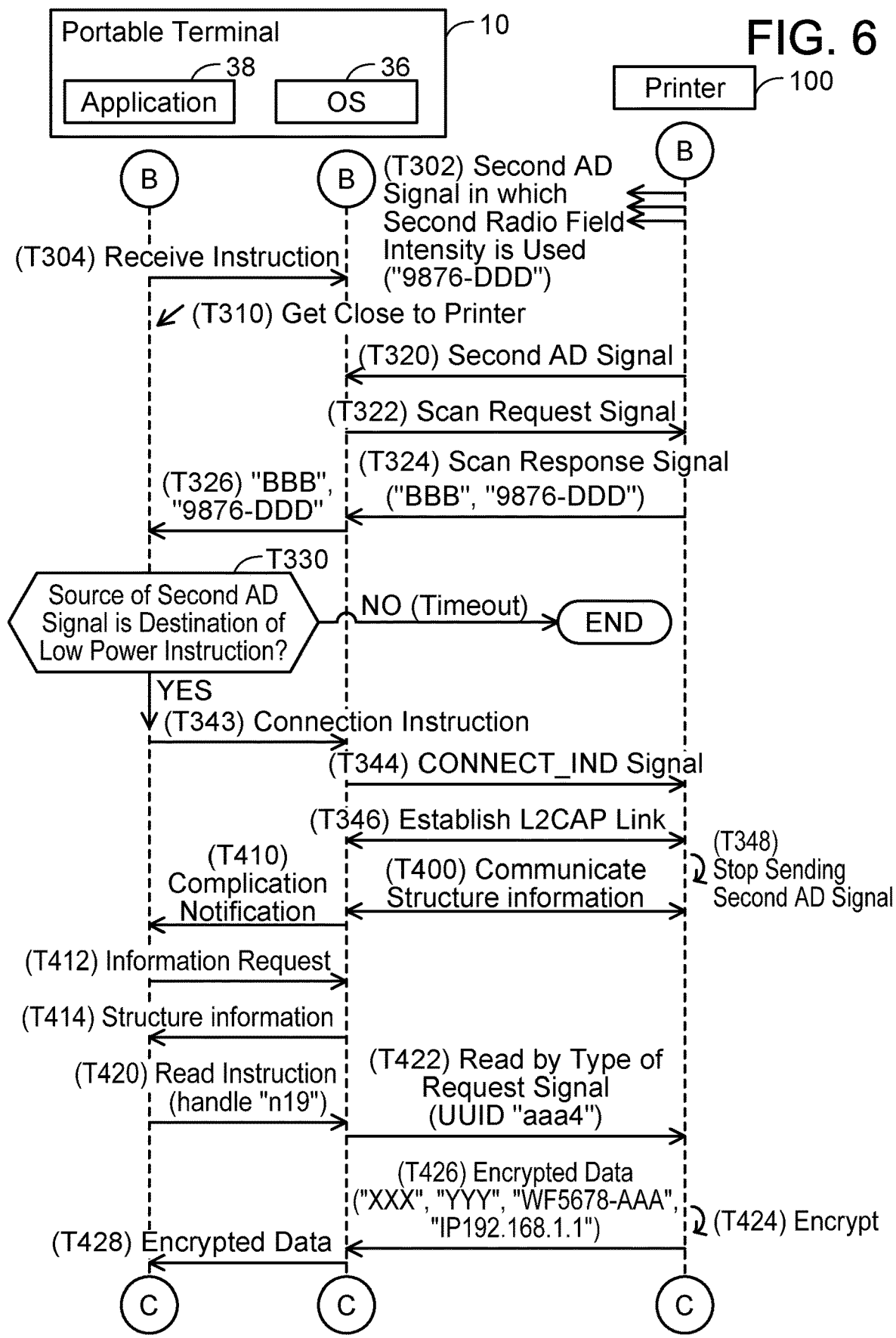
FIG. 6 shows a continuation of FIG. 5.

Next, a specific process executed by the terminal 10 and the printer 100 will be described with reference to FIGS. 4 to 7. Especially, since the PS group of the printer 100 has the data structure of FIG. 3, the CPU 132 of the printer 100 can realize the following process according to the PS group. Hereinbelow, for description of processes executed by the CPU 32 of the terminal 10 according to the OS 36 or the application 38, the OS 36 or the application 38 will be described as the subject of action. In FIGS. 4 to 7, communication between the terminal 10 and the printer 100 according to the BT scheme and communication therebetween according to the Wi-Fi scheme are indicated respectively with solid lines and broken lines. Further, each communication in FIGS. 4 to 6 is executed via the BT I/Fs 16, 116. As such, for description of the communication in FIGS. 4 to 6, the phrase of "via the T I/F 16 (or 116)" is omitted.

In T100, power of the printer 100 is turned on by a user. In this case, the CPU 132 of the printer 100 activates the BT I/F 116. As a result, the BT I/F 116 repeatedly sends a first advertising signal in which a first radio field intensity is used in T102. Here, the first radio field intensity is an intensity with which an advertising signal can be sent over ten or more meters. Hereinbelow, the advertising signal will be termed "AD signal". The first AD signal includes the MAC address "BT1234-AAA".

In T110, the user performs an operation to activate the application 38, and the user performs an operation to select an image file representing an image to be printed in T112. The image file selected in T112 may be a file stored in the memory 34 of the terminal 10, or may be a file obtained from an external source.

In T114, the application 38 supplies to the OS 36 a receive instruction for instructing reception of an AD signal. In this case, the OS 36 activates the BT I/F 16 and receives the first AD signal from the printer 100 in T120. In this case, the OS 36 sends a Scan Request signal to the printer 100 in T122. This signal is a signal for requesting sending of information of the printer 100.

When receiving the Scan Request signal from the terminal 10 (T122), the CPU 132 of the printer 100 sends a Scan Response signal including the model name "BBB" and the MAC address "BT1234-AAA" to the terminal 10 in T124.

When receiving the Scan Response signal from the printer 100 (T124), the OS 36 supplies the model name "BBB" and the MAC address "BT1234-AAA" included in the signal to the application 38 in T126.

By using the information obtained in T126, the application 38 determines whether or not the printer 100 has a Power-changing function in T130. Specifically, the application 38 firstly determines whether the obtained MAC address includes the vendor name "AAA" of the printer 100. In case of FIG. 4, the application 38 determines that the obtained MAC address includes the vendor name "AAA", and then determines whether the obtained model name is a model name of a printer having the Power-changing function. This determination is executed based on a model list that is prestored in the application 38. The model list includes model names of printers having the Power-changing function. In case of FIG. 4, the application 38 determines that the obtained model name is a model name of a printer having the Power-changing function. Thus, the application 38 determines YES in T130 and proceeds to T140.

In a case of determining that the obtained MAC address does not include the vendor name "AAA" or that the obtained model name is not a model name of a printer having the Power-changing function, the application 38 determines NO in T130 and proceeds to a normal process. Although not shown, the normal process is a process for executing pairing, without the printer lowering a radio field intensity of an AD signal, between the terminal 10 and a printer which is a communication counterpart of the terminal 10 and communicating information to establish a Wi-Fi connection. Specifically, the terminal 10 displays a screen for input of a PIN code and accepts input of the PIN code displayed on the printer, for example. Then, when authentication of this PIN code is successful, the terminal 10 establishes a BT connection with the printer. Then, the terminal 10 uses the BT connection to receive the information for establishing a Wi-Fi connection, and establishes a Wi-Fi connection using this information. After this, the terminal 10 uses the Wi-Fi connection to send the image file selected in T112 to the printer.

Processes from T140 are processes for establishing a BT connection between the terminal 10 and the printer 100 without input of a PIN code to the terminal 10 by the user. Since the user does not need to input a PIN code, usability for the user is improved. In T140, the application 38 displays a connection confirmation screen on the display unit 12. The connection confirmation screen is a screen for asking the user whether to establish a BT connection with the printer 100 having the model name "BBB" obtained in T126. The connection confirmation screen includes a YES button and a Cancel button.

In T142, the YES button in the connection confirmation screen is selected by the user. In this case, the application 38 supplies to the OS 36 a connection instruction for instructing establishment of a BT connection in T143. In this case, the OS 36 sends a CONNECT_IND signal to the printer 100 in T144.

When receiving the CONNECT_IND signal from the terminal 10 (T144), the CPU 132 establishes an L2CAP Link (i.e., BT connection) with the terminal 10 in T146. Then, in T148, the CPU 132 instructs the BT I/F 116 to stop sending the first AD signal.

(Process Continued from FIG. 4: FIG. 5)

In T200 of FIG. 5, the OS 36 uses the L2CAP Link established in T146 of FIG. 4 to communicate structure information with the printer 100. Specifically, the OS 36 receives from the printer 100 respective data (i.e., Handles, AValues, and APers; see FIG. 3) corresponding to the ATypes indicating the UUID "0x2800" or "0x2803" in the PS group. Then, in T210, the OS 36 supplies to the application 38 a completion notification indicating that the establishment of the L2CAP Link and the communication of the structure information have been completed.

When obtaining the completion notification from the OS 36 (T210), the application 38 supplies to the OS 36 an information request for requesting supply of the structure information in T212. Then, the application 38 obtains the structure information from the OS 36 in T214. By referring to the obtained structure information (especially the AValues), the application 38 can acknowledge the types (i.e., Read or Write), Handles, and UUIDs of information to be communicated (see the AValues in FIG. 3).

In T220, the application 38 creates a MAC address "9876-DDD" for HO. A MAC address for HO is created by selecting multiple characters at random, for example. Due to this, a unique MAC address for HO is created.

In T230, the application 38 supplies a write instruction including the Handle "n16" and the Low Power instruction to the OS 36. Due to this, the OS 36 sends a Write Request signal including the above information to the printer 100 in T232.

When receiving the Write Request signal from the terminal 10 (T232), the CPU 132 stores (i.e., writes) the Low Power instruction as the value of the AValue corresponding to the Handle "n16". Then, in T234, the CPU 132 supplies the Low Power instruction to the BT I/F 116. As a result, in processes to be described later, the BT I/F 116 can send a second AD signal using a second radio field intensity that is lower than the first radio field intensity (see T102 of FIG. 4).

In T240, the application 38 supplies a write instruction including the Handle "n17" and the MAC address "9876-DDD" for HO created in T220 to the OS 36. Due to this, in T242, the OS 36 sends a Write Request signal including the above information to the printer 100.

When receiving the Write Request signal from the terminal 10 (T242), the CPU 132 stores the MAC address "9876-DDD" for HO as the value of the AValue corresponding to the Handle "n17".

In T250, the application 38 supplies a write instruction including the Handle "n18" and the predetermined encryption key 200 to the OS 36. Due to this, in T252, the OS 36 sends a Write Request signal including the above information to the printer 100.

When receiving the Write Request signal from the terminal 10 (T252), the CPU 132 stores the encryption key 200 as the value of the AValue corresponding to the Handle "n18".

In T260, the application 38 supplies a write instruction including the Handle "n32" and the disconnection instruction to the OS 36. Due to this, in T262, the OS 36 sends a Write Request signal including the above information to the printer 100.

When receiving the Write Request signal from the terminal 10 (T262), the CPU 132 stores the disconnection instruction as the value of the AValue corresponding to the Handle "n32". Then, in T264, the CPU 132 disconnects the L2CAP Link established in T146 of FIG. 4 by sending a disconnect signal to the terminal 10.

When the application 38 completes supplying the respective write instructions to the OS 36 (i.e., when completing T260), it displays a notification screen on the display unit 12 in T270. The notification screen includes a message prompting the user to bring the terminal 10 closer to the printer 100 having the model name "BBB" obtained in T126 of FIG. 4. Due to this, the user can acknowledge that he/she should approach the printer 100 with the terminal 10.

(Process Continued from FIG. 5: FIG. 6)

When disconnecting the L2CAP Link in T264 of FIG. 5, the CPU 132 supplies the MAC address "9876-DDD" for HO received in T242 of FIG. 5 to the BT I/F 116. Due to this, in T302, the BT I/F 116 repeatedly sends a second AD signal including the MAC address "9876-DDD" for HO. The Low Power instruction has already been supplied to the BT I/F 116 in T234 of FIG. 5. Due to this, the BT I/F 116 sends the second AD signal in which the second radio field intensity that is lower than the first radio field intensity (see T102 of FIG. 4) is used. Here, the second radio field intensity is an intensity with which an AD signal can be sent over less than ten meters, and in the present embodiment, it is an intensity with which an AD signal can be sent over about one meter.

In T304, the application 38 supplies a receive instruction to the OS 36. This instruction is similar to the instruction in T114 of FIG. 4. Then, in T310, the terminal 10 is brought closer to the printer 100 so that the distance between the terminal 10 and the printer 100 is within a sending range of the second AD signal. In this case, the OS 36 receives the second AD signal from the printer 100 in T320. T322 to T326 are similar to T122 to T126 of FIG. 4 except that "9876-DDD" is used instead of "BT1234-AAA" as the MAC address.

Next, in T330, the application 38 uses the information obtained in T326 to determine whether the printer that is the source of the second AD signal is the printer that is the destination of the Low Power instruction in T232 of FIG. 5. Specifically, the application 38 determines whether the MAC address obtained in T326 matches the MAC address for HO created in T220 of FIG. 5. In case of FIG. 6, the application 38 determines that the obtained MAC address "9876-DDD" matches the MAC address for HO (YES in T330) and proceeds to T343. On the other hand, in a case of determining that the obtained MAC address does not match the MAC address for HO, the application 38 continues to monitor further reception of an AD signal until a predetermined time elapse. When the predetermined time elapses without the application 38 determining that the obtained MAC address matches the MAC address for HO, the application 38 determines NO in T330 and terminates the process. As above, in the present embodiment, the MAC address included in the first AD signal and the MAC address included in the second AD signal differ, and the application 38 does not execute processes from T343 in the case where the MAC address included in the second AD signal does not match the MAC address for HO. As such, for example, the terminal 10 does not execute the processes from T343 even if the terminal 10 receives an AD signal from a printer different from the printer 100 which is the destination of the Low Power instruction. Due to this, the processes from T343 can be executed between the terminal 10 and the suitable printer 100.

T343 to T346 are similar to T143 to T146 of FIG. 4. When an L2CAP Link is established in T346, the CPU 132 instructs the BT I/F 116 to stop sending the second AD signal in T348. T400 to T414 are similar to T200 to T214 of FIG. 5.

In T420, the application 38 supplies a read instruction including the Handle "n19" to the OS 36. Due to this, the OS 36 sends to the printer 100 a Read by Type Request signal including the UUID "aaa4" (see the AValue corresponding to the Handle "n14" in FIG. 3) corresponding to the Handle "n19" in T422.

When receiving the Read by Type Request signal from the terminal 10 (T422), the CPU 132 firstly obtains the value of the AValue corresponding to the UUID "aaa4" in the PS group. That is, the CPU 132 obtains the SSID "XXX", the password "YYY", the MAC address "WF5678-AAA", and the IP address "192.168.1.1" (see the AValue corresponding to the Handle "n19" in FIG. 3). Then, in T424, the CPU 132 uses the encryption key 200 received in T252 of FIG. 5 to encrypt the obtained information to create encrypted data. Then, the CPU 132 sends the created encrypted data to the terminal 10 in T426. As above, the printer 100 sends the encrypted data to the terminal 10, which prevents a terminal different from the terminal 10 from obtaining the information such as the SSID "XXX" and the password "YYY".

When receiving the encrypted data from the printer 100 (T426), the OS 36 supplies the encrypted data to the application 38 in T428.

Figure 7:
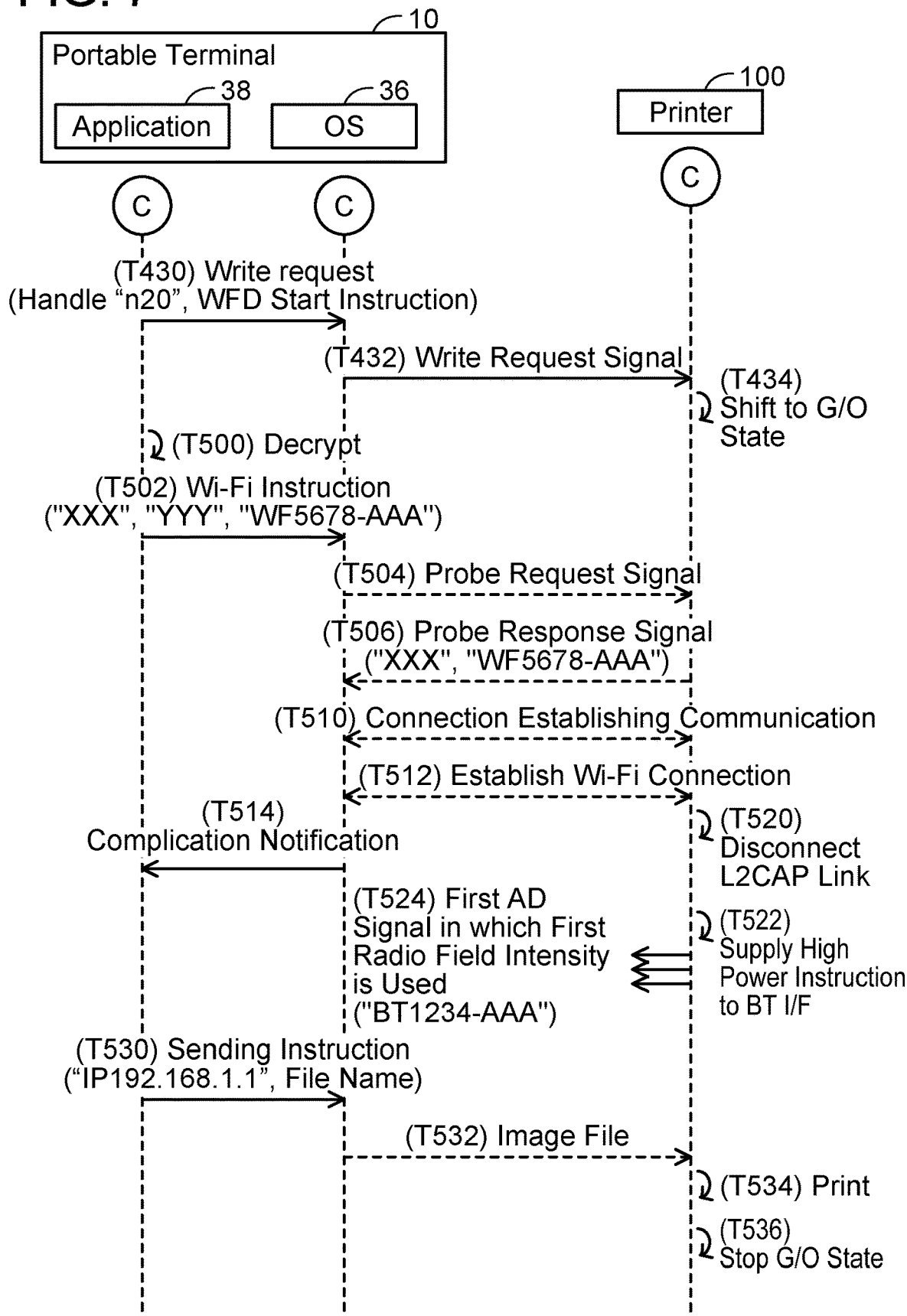
FIG. 7 shows a continuation of FIG. 6.

(Process Continued from FIG. 6: FIG. 7)

In T430 of FIG. 7, the application 38 supplies a write instruction including the Handle "n20" and the WFD start instruction to the OS 36. Due to this, the OS 36 sends a Write Request signal including the above information to the printer 100 in T432.

When receiving the Write Request signal from the terminal 10 (T432), the CPU 132 stores the WFD start instruction as the value of the AValue corresponding to the Handle "n20" in the PS group. Then, in T434, the CPU 132 shifts the state of the printer 100 to the G/O state from a state other than the G/O state of the WFD scheme (e.g., so-called device state).

In T500, the application 38 uses the encryption key 200 to decrypt the encrypted data obtained in T428 of FIG. 6. As a result, the application 38 can obtain the SSID "XXX", the password "YYY", the MAC address "WF5678-AAA", and the IP address "192.168.1.1". Then, the application 38 supplies to the OS 36 a Wi-Fi instruction including the SSID "XXX", the password "YYY", and the MAC address "WF5678-AAA" in T502.

When obtaining the Wi-Fi instruction from the application 38 (T502), the OS 36 activates the Wi-Fi I/F 14, and in T504, it broadcasts a Probe Request signal via the Wi-Fi I/F 14.

When receiving the Probe Request signal from the terminal 10 via the Wi-Fi I/F 114 (T504), the CPU 132 sends a Probe Response signal including the SSID "XXX" and the MAC address "WF5678-AAA" to the terminal 10 via the Wi-Fi I/F 114 in T506.

When receiving the Probe Response signal from the printer 100 via the Wi-Fi I/F 14 (T506), the OS 36 determines that the SSID "XXX" included in this signal matches the SSID obtained in T500, and determines that the MAC address "WF5678-AAA" included in this signal matches the MAC address obtained in T500. That is, the OS 36 determines that the printer 100, which is the source of the Probe Response signal, is a device with which a Wi-Fi connection is to be established.

In T510, the OS 36 executes connection establishing communication with the printer 100 via the Wi-Fi I/F 14. The connection establishing communication includes various types of communication such as Authentication, Association, and 4-Way Handshake. In the course of the connection establishing communication, data obtained by using the SSID "XXX" and the password "YYY" obtained in T500 is sent to the printer 100, and authentication is executed in the printer 100. In this case, since the authentication is successful, a Wi-Fi connection is established between the terminal 10 and the printer 100 in T512. When the Wi-Fi connection with the printer 100 is established (T512), the OS 36 supplies to the application 38 a completion notification indicating that establishment of the Wi-Fi connection has been completed in T514.

When the Wi-Fi connection with the terminal 10 is established (T512), the CPU 132 disconnects the L2CAP Link established in T346 of FIG. 6 by sending a disconnect signal to the terminal via the BT I/F 116 in T520. Then, the CPU 132 supplies a High Power instruction to the BT I/F 116 in T522. Due to this, the BT I/F 116 repeatedly sends a first AD signal using the first radio field intensity in T524. The first AD signal sent in T524 is similar to the first AD signal sent in T102 of FIG. 4, and includes the MAC address "BT1234-AAA" assigned in advance to the BT I/F 116 instead of the MAC address "9876-DDD" for HO. As above, once the communication of information such as the SSID "XXX" and the password "YYY" is completed, the printer 100 can restore the radio field intensity used for sending AD signal to the original setting. Although not shown, the CPU 132 deletes the information stored in response to the respective Write Request signals received in T232, T242, T252, and T262 of FIGS. 5 and T432 of FIG. 7.

When obtaining the completion notification from the OS 36 (T514), the application 38 supplies to the OS 36 a send instruction for instructing sending of an image file in T530. The send instruction includes the IP address "192.168.1.1" obtained in T500 of FIG. 7 and a file name of the image file selected in T112 of FIG. 4. Due to this, in T532, the OS 36 uses the Wi-Fi connection established in T512 to send the image file to the printer 100 with the IP address "192.168.1.1" as its destination.

When receiving the image file from the terminal 10 (T532), the CPU 132 instructs the print executing unit 118 to print the image represented by the image file in T534. As a result, the print executing unit 118 executes printing of the image. Further, the CPU 132 shifts the state of the printer 100 from the G/O state to a state other than the G/O state in T536. As a result, the Wi-Fi connection established in T512 is disconnected.

(Effects of Present Embodiment)

According to the present embodiment, in the case where the printer 100 receives the CONNECT_IND signal from the terminal 10 (T144) after having sent the first AD signal in which the first radio field intensity is used (T102 of FIG. 4), it establishes the L2CAP Link with the terminal 10 (T146). In the case of receiving the Write Request including the Low Power instruction from the terminal 10 using the L2CAP Link (T232 of FIG. 5), the printer 100 changes the radio field intensity used for sending AD signal from the first radio field intensity to the second radio field intensity which is lower than the first radio field intensity (T234). Due to this, the terminal 10 cannot receive the second AD signal in which the second radio field intensity is used from the printer 100 unless the distance between the printer 100 and the terminal 10 decreases. Then, in the case of receiving the Write Request including the disconnection instruction from the terminal 10 (T262), the printer 100 disconnects the L2CAP Link and sends the second AD signal in which the second radio field intensity is used (T302 of FIG. 6). In the case where the printer 100 receives the CONNECT_IND signal from the terminal 10 (T344) which received the second AD signal as the result of decrease in the distance between the printer 100 and the terminal 10 (within 1 meter in the present embodiment), the printer 100 establishes the L2CAP Link with the terminal 10 (T346). The printer 100 communicates the information such as the SSID "XXX" and the password "YYY" with the terminal 10 using this L2CAP Link (T422). Then, the printer 100 establishes the Wi-Fi connection with the terminal 10 using the above information (T512 of FIG. 7), receives the image file from the terminal 10 using the Wi-Fi connection (T532), and executes printing of the image represented by the image file (T534).

Here, a comparative example is assumed in which the information such as the SSID "XXX" is communicated using the L2CAP Link established in T146 of FIG. 4. In this comparative example, in a case where the distance between the printer 100 and the terminal 10 is relatively large (10 meters or more in the present embodiment), the above information is communicated without authentication of a PIN code (i.e., without pairing). In this case, for example, if the printer 100 is installed in an office of a company, the terminal 10 located at a place different from this office (e.g., in an office of another company next to the office where the printer 100 is installed) may receive the information such as the SSID "XXX" from the printer 100. Further, the terminal 10 can use this information to establish a Wi-Fi connection with the printer 100 and cause the printer 100 to execute printing of an image. As above, in the comparative example, a third party that is not a legitimate user of the printer 100 can use the printer 100. Contrary to this, according to the present embodiment, the information such as the SSID "XXX" is not communicated using the L2CAP Link established in T146 of FIG. 4. The above information is communicated using the L2CAP Link (see T346 of FIG. 6) which is established as the result of the radio field intensity used for sending AD signal being lowered and the distance between the printer 100 and the terminal 10 being decreased. In other words, the above information is not communicated unless the user brings the terminal 10 close to the printer 100, which prevents a third party from using the printer 100. As above, according to the present embodiment, the printer 100 and the terminal 10 can suitably control the communication of the above information in accordance with the distance between the printer 100 and the terminal 10.

(Corresponding Relationships)

The printer 100, the terminal 10, the BT I/F 116, the Wi-Fi I/F 114, and the BT I/F 16 are respectively examples of "function executing device", "terminal device", "first wireless interface", "second wireless interface", and "wireless interface". The Low Power instruction communicated in T232 of FIG. 5 is an example of "specific signal". The CONNECT_IND signal of T344 of FIG. 6 and the CONNECT_IND signal in T144 of FIG. 4 are respectively examples of "first connection request (or connection request)" and "second connection request". The L2CAP Link in T346 of FIG. 6, the L2CAP Link in T146 of FIG. 4, and the Wi-Fi connection in T512 of FIG. 7 are respectively examples of "first wireless connection (or wireless connection)", "second wireless connection", and "third wireless connection". The information such as the SSID "XXX" and the password "YYY" communicated in T426 of FIG. 6 is an example of "target information". The MAC address "BT1234-AAA" and the MAC address "9876-DDD" are respectively examples of "first identification information" and "second identification information".

The process of T144 and the process of T146 of FIG. 4 are respectively examples of "receive a second connection request" and "establish a second wireless connection". The process of T232, the process of T242, the process of T252, and the process of T264 of FIG. 5 are respectively examples of "receive a specific signal", "communicate second identification information", "communicate an encryption key", and "disconnect the second wireless connection". The process of T302, the process of T344, the process of T346, and the process of T426 of FIG. 6 are respectively examples of "change a radio field intensity used for sending the advertising signal from the first radio field intensity to a second radio field intensity", "receive a first connection request", "establish a first wireless connection", and "communicate target information". The process of T522, the process of T532, and the process of T534 of FIG. 7 are respectively examples of "change the radio field intensity used for sending the advertising signal from the second radio field intensity to the first radio field intensity", "receive image data", and "cause the print executing unit to print the image".

The processes of T114 and T120 of FIG. 4 are an example of "receive a first advertising signal". The processes of T143 and T144 are an example of "send a second connection request". The processes of T230 and T232 of FIG. 5 are an example of "send a specific signal". The processes of T304 and T320 of FIG. 6 are an example of "receive a second advertising signal". The processes of T343 and T344 are an example of "send a connection request (or send a first connection request)". The processes of T420, T422, and T426 are an example of "communicate target information".

(Variant 1) The printer 100 may not receive the Low Power instruction in T232 of FIG. 5. In this case, for example, the printer 100 may lower the radio field intensity used for sending the AD signal on condition that the printer 100 receives the Scan Request signal in T122 of FIG. 4. In this variant, the Scan Request signal is an example of the "specific signal". Especially in the present variant, the L2CAP Link of T146 may not be established. That is, "receive a second connection request", "establish a second wireless connection", and "disconnect the second wireless connection" by the "function executing device" may be omitted. Further, "send a second connection request" by the "terminal device" may also be omitted. Further, in another variant, the printer 100 may lower the radio field intensity used for sending the AD signal on condition that the printer 100 receives the CONNECT_IND signal in T144 of FIG. 4. In this variant, the CONNECT_IND signal is an example of the "specific signal".

(Variant 2) The printer 100 may lower the radio field intensity used for sending the AD signal on condition that the L2CAP Link in T146 of FIG. 4 is established, without receiving the Low Power instruction of T232 of FIG. 5. In this variant, "receive a specific signal" by the "function executing device" may be omitted. Further, "send a specific signal" by the "terminal device" may also be omitted.

(Variant 3) The terminal 10 may shift to the G/O state instead of the printer 100 shifting to the G/O state. In this case, the printer 100 may receive from the terminal 10 an SSID, a password, etc. of a wireless network in which the terminal 10 operates as the G/O instead of the printer 100 sending the SSID, etc. to the terminal 10 in T426 of FIG. 6. In general terms, "communicate target information" between the "function executing device" and the "terminal device" may be executed by the function executing device sending the target information to the terminal device as in the above embodiment or by the terminal device sending the target information to the function executing device as in the present variant.

(Variant 4) In T426 of FIG. 6, the printer 100 may send to the terminal 10 a login password for logging into the printer 100 instead of the SSID, etc. In this case, the terminal 10 displays the login password, and the user can log into the printer 100 (i.e., the user can bring the printer 100 to a usable state) by inputting this login password to the printer 100. In this variant, the login password is an example of the "target information", and the "second wireless interface", "receive image data", and "cause the print executing unit to print the image" in the "function executing device" may be omitted. Further, the "target information" may be other information for using the specific function of the function executing device (e.g., information indicating a status of the printer 100, information of print history stored in the printer 100, etc.).

(Variant 5) The printer 100 may start sending the second AD signal in a state where the L2CAP Link is established after the Low Power instruction has been supplied to the BT I/F 116 in T234 of FIG. 5. In general terms, the second advertising signal may be sent before the second wireless connection is disconnected.

(Variant 6) The printer 100 may disconnect the L2CAP Link on condition that the printer 100 receives the encryption key in T252, for example, even if the printer 100 does not receive the disconnection instruction of T262 of FIG. 5. In the present variant, "receive a disconnection instruction" by the "function executing device" may be omitted.

(Variant 7) The printer 100 may not receive the MAC address "9876-DDD" in T242 of FIG. 5 from the terminal 10. Further, in T302 of FIG. 6, the printer 100 may send a second AD signal including a MAC address that matches the MAC address "BT1234-AAA" included in the first AD signal. In this case, the terminal 10 proceeds to T343 without executing the process of T330. In the present variant, "communicate second identification information" by the "function executing device" may be omitted, and the second advertising signal does not include the second identification information.

(Variant 8) The printer 100 may create a unique MAC address and send this MAC address to the terminal 10 instead of receiving the MAC address "9876-DDD" from the terminal 10 in T242 of FIG. 5. In this case, the printer 100 sends a second AD signal including this unique MAC address in T302 of FIG. 6. The terminal 10 executes the determination of T330 using this MAC address received from the printer 100. In general terms, "communicate second identification information" may include sending the second identification information from the terminal device to the function executing device as in the above embodiment, or include sending the second identification information from the function executing device to the terminal device as in this variant.

(Variant 9) The printer 100 may not receive the encryption key 200 from the terminal 10 in T252 of FIG. 5. In this case, the printer 100 may not encrypt the information such as the S SID "XXX" and the password "YYY", and may send these information to the terminal 10 in T426 of FIG. 6. In this variant, "communicate an encryption key" by the "function executing device" may be omitted.

(Variant 10) The printer 100 may send the encryption key 200 to the terminal 10 in T252 of FIG. 5 instead of receiving the encryption key 200 from the terminal 10. In general terms, "communicate an encryption key" may include sending the encryption key from the terminal device to the function executing device as in the above embodiment, or include sending the encryption key from the function executing device to the terminal device as in this variant.

(Variant 11) The "function executing device" may not be the printer 100, and may, for example, be a scanner, a FAX device, a multi-function peripheral, a PC, or a server.

(Variant 12) In the above embodiment, the respective processes of FIGS. 4 to 7 are implemented by the CPU 132 of the printer 100 executing the program 136 (that is, software) and the CPU 32 of the terminal device 10 executing the programs 36, 38. Instead of this, one or more of the processes may be implemented by hardware such as a logic circuit.

What is claimed is:

1. A function executing device comprising:
   a first wireless interface configured to execute wireless communication according to a Bluetooth (Registered Trademark) Low Energy (BLE) scheme, the first wireless interface being capable of sending an advertising signal;
   a second wireless interface configured to execute wireless communication according to a Wi-Fi (Registered Trademark) scheme;
   a processor; and
   a memory storing computer-readable instructions,
   wherein the computer-readable instructions, when executed by the processor, cause the function executing device to:
   send a first advertising signal from the first wireless interface;
   after sending of the first advertising signal is stopped, send a second advertising signal from the first wireless interface, wherein a distance at which the second advertising signal is capable of being received by an external device is shorter than a distance at which the first advertising signal is capable of being received by the external device;
   after receiving a specific signal via the first wireless interface from a terminal device which has received the second advertising signal, send target information to the terminal device which is a sender of the specific signal via the first wireless interface;
   in a case where a Wi-Fi connection request is received from the terminal device after the target information is sent to the terminal device, establish a Wi-Fi wireless connection with the terminal device via the second wireless interface.

2. The function executing device as in claim 1, further comprising:
   a print executing unit,
   wherein the computer-readable instructions, when executed by the processor, further cause the function executing device to:
   in a case where the Wi-Fi wireless connection is established, receive image data representing an image to be printed from the terminal device via the second wireless interface by using the Wi-Fi wireless connection; and
   in a case where the image data is received from the terminal device, cause the print executing unit to print the image represented by the image data.

3. The function executing device as in claim 1, wherein the computer-readable instructions, when executed by the processor, further cause the function executing device to:
   after sending of the first advertising signal is stopped, change a radio field intensity used for sending the advertising signal from a first radio field intensity for the first advertising signal to a second radio field intensity for the second advertising signal.

4. The function executing device as in claim 3, wherein the computer-readable instructions, when executed by the processor, further cause the function executing device to:
   after the target information is sent to the terminal device, change the radio field intensity used for sending the advertising signal from the second radio field intensity to the first radio field intensity.

5. The function executing device as in claim 1, wherein the computer-readable instructions, when executed by the processor, further cause the function executing device to:
   establish a link via the first wireless interface with the terminal device which has received the first advertising signal from the function executing device; and
   wherein the second advertising signal is sent from the first wireless interface after the link has been disconnected.

6. The function executing device as in claim 5, wherein the computer-readable instructions, when executed by the processor, further cause the function executing device to:
   receive a disconnection instruction from the terminal device via the first wireless interface by using the link, and
   the link is disconnected in a case where the disconnection instruction is received from the terminal device.

7. The function executing device as in claim 1, wherein the first advertising signal includes first identification information for identifying the function executing device,
   the computer-readable instructions, when executed by the processor, further cause the function executing device to:
   communicate, via the first wireless interface, second identification information with the terminal device which has received the first advertising signal from the function executing device, the second identification information being information for identifying the function executing device and being different from the first identification information, and
   the second advertising signal includes the second identification information.

8. The function executing device as in claim 1, wherein the computer-readable instructions, when executed by the processor, further cause the function executing device to:
   communicate, via the first wireless interface, an encryption key with the terminal device which has been received the first advertising signal from the function executing device, and
   the target information which is sent to the terminal device is encrypted by the encryption key.

* * * * *